UNITED STATES PATENT OFFICE.

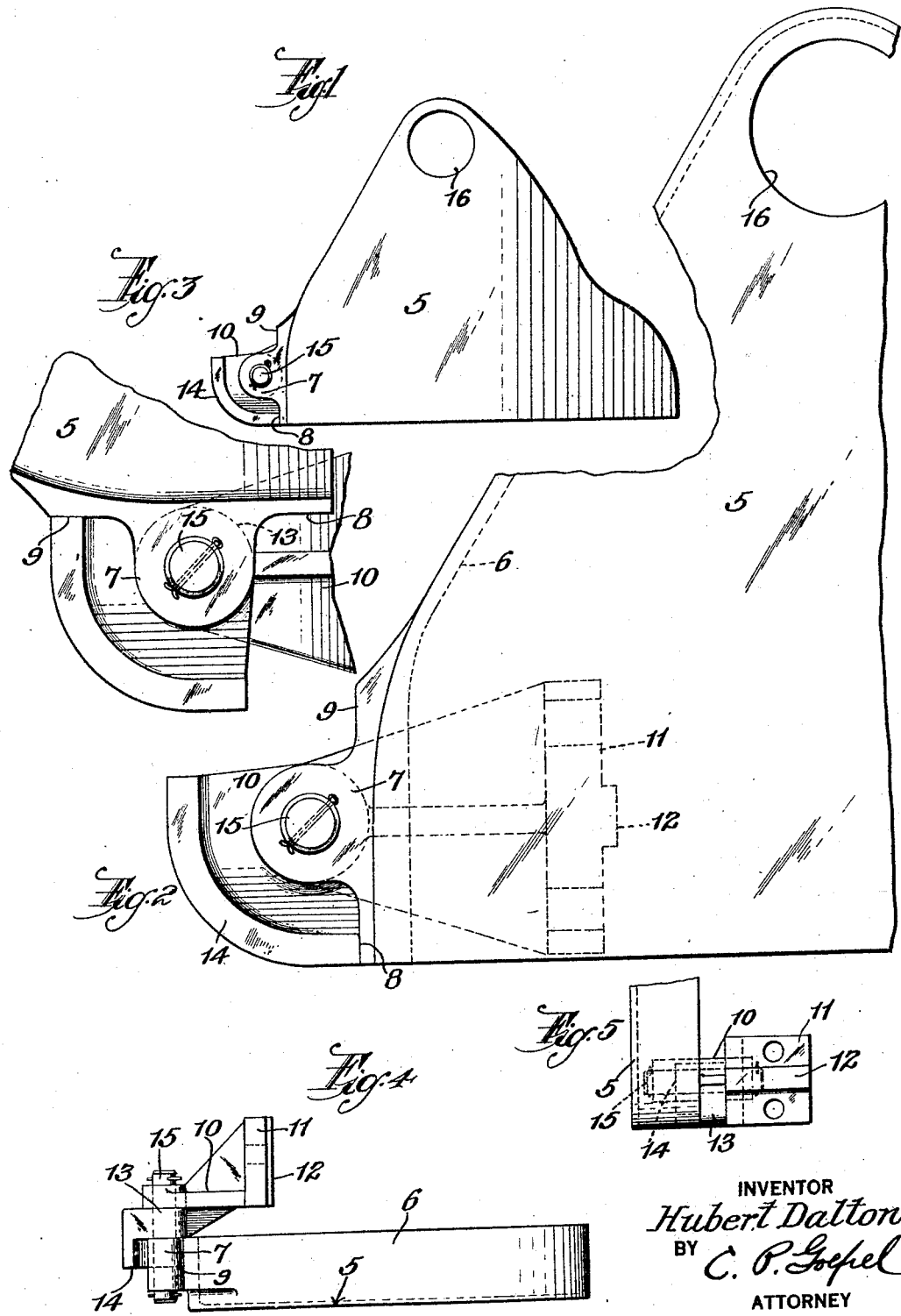

HUBERT DALTON, OF NEW YORK, N. Y.

GEAR GUARD.

1,408,866.  Specification of Letters Patent.  Patented Mar. 7, 1922.

Application filed November 29, 1921. Serial No. 518,517.

*To all whom it may concern:*

Be it known that I, HUBERT DALTON, a citizen of the United States, and resident of New York city, in the county and State of New York, have invented certain new and useful Improvements in Gear Guards, of which the following is a specification.

This invention relates to gear guards and has for its primary object to simplify the mounting and construction cost of hinged or pivoted guards such as are commonly provided for machine gearing.

More particularly, I propose in the present invention to provide an improved form of supporting bracket upon which the guard member is pivotally mounted, said bracket having integral means with which means on the guard coacts to limit the movement of the guard to either its open or closed positions.

With the above and other objects in view, the invention consists in the improved gear guard and mounting therefor, as will be hereinafter more fully described, illustrated in the accompanying drawings and subsequently incorporated in the subjoined claims.

In the drawing wherein I have disclosed one preferable and satisfactory embodiment of the invention, and in which similar reference characters designate corresponding parts throughout the several views, Figure 1 is a side elevation showing the guard in closed position;

Fig. 2 is an enlarged fragmentary elevation;

Fig. 3 is a similar view, the guard being shown in open position;

Fig. 4 is a plan view; and

Fig. 5 is a detail elevation of the supporting bracket and a part of the guard member.

Referring in detail to the drawing, wherein I have disclosed one adaptation of my invention, the guard member 5 may be of any desired size and shape which will vary in accordance with conditions. This guard member consists of a casting having a front plate 5 which is provided with a marginal flange 6 around its entire edge extending at right angles to the plane of said plate. The rear side and the bottom of the guard are open.

Upon one side of the flange 6 at the lower end of the guard a knuckle 7 is cast, the casting at opposite sides of said knuckle and out of alignment with the axis thereof being provided with the laterally extending surfaces 8 and 9 respectively.

The guard 5 is supported upon a bracket 10 which might be cast in various forms or shapes. It will suffice to state that this bracket is provided with an attaching flange 11 extending laterally from one side of its body portion, said flange being preferably formed with a key-rib 12 on one face for engagement in a corresponding groove or channel in a fixed part of the machine frame. The bracket is rigidly fixed in position by suitable screws or bolts engaged through openings provided in the flange 11. In spaced relation to the attaching flange, the bracket is formed with a knuckle 13 having its axis in parallel relation to the flange 11. In concentric relation to the knuckle 13 a curved flange 14 is provided on the bracket projecting laterally therefrom in an opposite direction with respect to the attaching flange 11. The end portions of the flange 14 extend beyond 90° angles radiating from the knuckle 13 as clearly shown in Figures 2 and 3 of the drawings, said end portions of the flange extending rectilinearly from the intermediate curved portion thereof.

In mounting the guard 5 upon the supporting bracket the knuckle 7 of the guard is arranged with its bore in axial alignment with the knuckle 13 of the bracket upon the side of the bracket from which the flange 14 projects and a pivot pin 15 is disposed through the aligned knuckles. In lieu of this pivot pin a suitable bolt or screw might be used fixed at one end in the bracket and having the knuckle 7 loosely engaged upon its other end.

Normally, the guard 5 is disposed in an upright position, as seen in Fig. 1 so that it covers or completely houses the gears, affording a complete protection to the workmen from possible injury by the hands or parts of the clothing being caught between intermeshing gear elements. The movement of the guard member to this normal position is limited by contact of the shoulder or surface 8 with the horizontally extending end portion of the flange 14, as clearly seen in Fig. 3. The front wall of the guard 5 at its upper end may be provided with an opening 16 or other suitable means with which the fingers of the hand may be engaged in order to move the guard from its normal upright position to a laterally extending position at one side of the bracket 10 to thereby expose the gearing when it is necessary to change the gears or make repairs thereto. The movement of the gear guard to this open position is limited by the machined surface or shoulder 9 coming into contact with the vertically extending end of the flange 14, as seen in Fig. 3. Thus the guard member is sustained against a downward gravity movement and the pivot pin 15 and the bores of the knuckles 7 and 13 are to a large extent, preserved against the effects of excessive wear. In the ordinary gear guard of this character the guard member is merely hinged by means of a standard hinge to a bracket or a part of the machine frame. By means of the construction herein described, the cost incident to the making of the guard and its attachment to the machine is reduced to a minimum since the only parts which require machining are the openings for pin 15.

From the foregoing description considered in connection with the accompanying drawing, the construction, manner of use and several advantages of my improved gear guard and mounting therefor will be clearly understood. The device being exceedingly simple is also highly durable in practical use and very serviceable and convenient for the intended purpose. As above noted, the guard member may be produced in various sizes and shapes. Likewise, the size and form of the supporting bracket as well as the other structural details might be variously modified and the device exemplified in numerous other alternative structures without departing from the spirit and scope of the invention as claimed.

I claim:

1. In combination, a guard member, a fixed supporting bracket, means for pivotally mounting the guard member at one side thereof upon said bracket, said bracket being provided with a flange disposed in spaced relation to the pivot, said guard member having shoulders located at opposite sides of the pivot for engagement with the opposite ends of said flange respectively to limit the pivotal movement of the guard member upon the bracket to its normal position over the gears or to an open position at one side of the gears.

2. In combination, a guard member, a supporting bracket therefor, means for pivotally mounting the guard member upon one side of said bracket, said bracket having an angular flange extending from the side thereof on which the bracket is mounted, the end portions of the flange extending at right angles with respect to each other beyond 90° angles radiating from the pivot, and said guard member having stop shoulders at opposite sides of the pivot and out of alignment therewith for engagement upon opposite ends of said flange respectively, to limit the pivotal movement of the guard member to a normal position over the gears or to a position at one side thereof.

3. In combination, a guard member, a supporting bracket therefor having an attaching flange projecting laterally from one side of its body portion at one end and a stop flange projecting laterally from the opposite side of said body at its other end, and means for pivotally mounting the guard member upon the latter side of the bracket, said guard member having shoulders at opposite sides of the pivot and out of alignment therewith for engagement with the opposite ends of said flange respectively, to limit the pivotal movement of the guard member to its normal position over the gears or to a position at one side thereof.

4. In combination, a supporting bracket having an attaching flange and a stop flange projecting laterally in respectively opposite directions from the bracket body, said bracket being further provided with a pivot receiving knuckle, a guard member having a knuckle projecting from one side thereof, a connecting pivot extending through the knuckles on said bracket and guard member, and said guard member being provided with stop shoulders at opposite sides of said pivot knuckle and out of alignment with the axis thereof, for engagement with the opposite ends of said stop flange respectively, to limit the pivotal movement of the guard member to its normal position over the gears or to an open position at one side thereof.

In testimony that I claim the foregoing as my invention, I have signed my name hereunder.

HUBERT DALTON.